United States Patent [19]
Suzuki et al.

[11] Patent Number: 5,881,899
[45] Date of Patent: Mar. 16, 1999

[54] ADHESIVE INJECTION APPARATUS

[75] Inventors: Masahiro Suzuki, Miyoshi-machi; Yoshihiko Miyoshi; Yukihiko Okada, both of Hiroshima, all of Japan

[73] Assignee: Sho-Bond Corporation, Tokyo, Japan

[21] Appl. No.: 886,019

[22] Filed: Jun. 30, 1997

[30] Foreign Application Priority Data

Aug. 30, 1996 [JP] Japan ..................................... 8-246915

[51] Int. Cl.⁶ ................................................. B65D 45/32
[52] U.S. Cl. ........................... 220/319; 215/232; 215/274
[58] Field of Search .................................. 215/232, 274; 220/319

[56] References Cited

U.S. PATENT DOCUMENTS

| | | | |
|---|---|---|---|
| 3,693,820 | 9/1972 | Linkletter ............................. | 215/274 X |
| 4,089,433 | 5/1978 | Jonsson .................................... | 215/218 |
| 4,984,702 | 1/1991 | Pierpont ................................. | 215/272 |
| 5,294,011 | 3/1994 | Konrad et al. .......................... | 215/247 |

Primary Examiner—Stephen K. Cronin
Attorney, Agent, or Firm—Armstrong, Westerman, Hattori, McLeland & Naughton

[57] ABSTRACT

An adhesive injection apparatus comprising: an adhesive reservoir tube having a flange portion; a connection cap having a pressing portion, a large-diameter portion, and a plurality of axially extending protrusions formed side by side circumferentially on an inner wall of the large-diameter portion, the large-diameter portion having an inner diameter larger than an outer diameter of the flange portion of the adhesive reservoir tube; and a nozzle having a flange portion; wherein when the adhesive reservoir tube and the nozzle portion are connected to each other, the flange portion of the adhesive reservoir tube is interposed between the pressing portion of the connection cap and the flange portion of the nozzle so that the flange portion of the adhesive reservoir tube is pressed by the pressing portion of the connection cap and the flange portion of the nozzle in a condition that the plurality of axially extending protrusions of the connection cap are in contact with an outer edge of the flange portion of the adhesive reservoir tube.

2 Claims, 7 Drawing Sheets

ADHESIVE INJECTION APPARATUS

BACKGROUND OF THE INVENTION

The present invention generally relates to an adhesive injection apparatus, and particularly relates to an adhesive injection apparatus to be used in an adhesive injection method which is suitable for mending cracks generated in a concrete or mortar structure.

As the method of mending cracks generated in a concrete structure, a mortar structure, or the like, such a method that an adhesive of synthetic resin such as epoxy resin, unsaturated polyester resin, or the like is injected into cracks is well known.

As the mending method using adhesive injection, formally, there was such a method (Japanese Patent No. 251791) comprising the steps of attaching pipes on cracks at suitable intervals, sealing portions except the injection nozzle attachment position, connecting the injection nozzle to an injection pump after solidification of a sealing material, and injecting an adhesive. In this method, however, there were some difficulties in work.

Recently, therefore, there are known a mending method proposed in Japanese Patent No. 1558990 in which when an adhesive is injected into cracks or the like generated in a structure, the adhesive is stored in adhesive reservoir tubes provided in desirable positions in a range from an injection nozzle to a send-out side (an injection hose) of an adhesive injector (pump) so that adhesive injection pressure acting on the cracks or the like in the structure is relieved and the stored adhesive is injected on the basis of a lasting change of the pressure of the tubes; another mending method proposed in Japanese Patent No. 1566024 in which an adhesive is filled in advance into a tube acting so as to press the adhesive filled therein, an adhesive inlet/outlet port is closed with a check valve, and then the tube is connected to an injection nozzle attached to adhesive injecting portions such as cracks or the like so that the adhesive inlet/outlet is opened and the adhesive is injected into the cracks or the like owing to a lasting change of the pressure of the tube; and so on.

As the apparatus to be used in the foregoing methods, Japanese Patent No. 1537261 proposes an adhesive injection apparatus in which one end of an adhesive reservoir tube is connected and fixed to one end of a nozzle having an injection port corresponding to cracks or the like and having, at its other end, an attachment washer, the other end of the adhesive reservoir tube is connected and fixed to another nozzle to be connected to a send-out side (hose side) of an adhesive injector (pump), and a check valve is provided on the other nozzle side. Further, Japanese Patent No. 1566024 and No. 1635377 propose an adhesive injection apparatus in which an attachment port having, at its one end, an attachment washer is connected to one end of an adhesive reservoir tube through a connection port for connection of the attachment port, and a valve system for releasing its closed state when the connection port and the attachment port are connected to each other. Moreover, Japanese Patent No. 1716183 proposes another adhesive injection apparatus.

Although these new proposals can provide an extremely remarkable effect in mending cracks in the structures, there are generated problems in the structure of the apparatuses.

In a conventional apparatus for injecting an adhesive generally, as shown in FIG. 11, an adhesive reservoir tube (hereinafter, simply referred to as a tube) 1 formed from an elastic material such as rubber or the like and a nozzle 2 are provided integrally with each other in such a manner that a flange portion 1a formed on an end of the tube 1 is interposed between a pressing portion 3a of a connection cap 3 and a flange portion 2a formed on a nozzle 2. The connection cap 3 is constituted by large and small-diameter portions 3b and 3d and the pressing portion 3a which connects the portions 3b and 3d to each other. Annular protrusions 2c and 3c are formed on the flange portion 2a of the nozzle 2 and the pressing portion 3a of the connection cap 3 respectively. The annular protrusions 2c and 3c dig into the flange portion 1a of the tube 1 so as to prevent the flange portion 1a of the tube 1 from coming-off from between the connection cap 3 and the nozzle 2. Generally, the nozzle 2 and the cap 3 are formed from synthetic resin molding.

Here, the inner diameter of the connection cap 3 is formed to be larger than the outer diameter of the flange portion 1a of the tube 1. This is because that the difference in diameter produces an air space 4 for absorbing the squeeze-out of a transformed portion of the flange portion 1a of the tube 1 due to compression when the flange portion 1a of the tube 1 is interposed between the flange portion 2a of the nozzle 2 and the pressing portion 3a of the connection cap 3 and pressed by the annular protrusions 2c and 3c.

Because of existence of such an air space 4, however, when the tube 1 is fitted into the connection cap 3, the centering of the tube 1 is not always achieved well, and there may be a case where the tube 1 is one-sidedly positioned near one-side inner wall surface of the connection cap 3 as shown in FIG. 11 (left side in the illustrated case). If the flange portion 1a of the tube 1 is compressed between the pressing portion 3a of the connection cap 3 and the flange portion 2a of the nozzle 2, the flange portion 2a is unevenly compressed so that the tube 1 is unevenly extended so as to curve as shown in FIG. 12. If the tube 1 in the curved state is directly or indirectly connected to an adhesive injector (not shown) and an adhesive is injected from the adhesive injector into the tube 1, the nozzles 2, the cap 3, and the tube 1 can not be in a linear state to cause a phenomenon that the assembly of the nozzle 2, the caps 3 and the tube 1 becomes curved, as shown in FIG. 13.

As a result, a force in the direction of coming off from the cap 3 is exerted unevenly on the tube 1 with a fear that the tube 1 actually comes off from the cap 3.

SUMMARY OF THE INVENTION

An object of the present invention is to solve the above conventional problems.

In order to achieve the above object, according to the present invention, provided is an adhesive injection apparatus comprising: an adhesive reservoir tube having a flange portion; a connection cap having a pressing portion, a large-diameter portion, and a plurality of axially extending protrusions formed side by side circumferentially on an inner wall of the large-diameter portion, the large-diameter portion having an inner diameter larger than an outer diameter of the flange portion of the adhesive reservoir tube; and a nozzle having a flange portion; wherein when the adhesive reservoir tube and the nozzle portion are connected to each other, the flange portion of the adhesive reservoir tube is interposed between the pressing portion of the connection cap and the flange portion of the nozzle so that the flange portion of the adhesive reservoir tube is pressed by the pressing portion of the connection cap and the flange portion of the nozzle in a condition that the plurality of axially extending protrusions of the connection cap are in contact with an outer edge of the flange portion of the adhesive reservoir tube.

In the above adhesive injection apparatus, preferably, the nozzle has a recess portion which is formed in a pressing surface of the flange portion of the nozzle for pressing the flange portion of the adhesive reservoir tube, and has a plurality of radially extending ribs formed in the recess portion so as to divide the recess portion into sections.

DETAILED DESCRIPTION OF THE PREFERRED EMBODIMENT

Next, embodiments of the present invention will be described with reference to the accompanied drawings.

Figure 1:
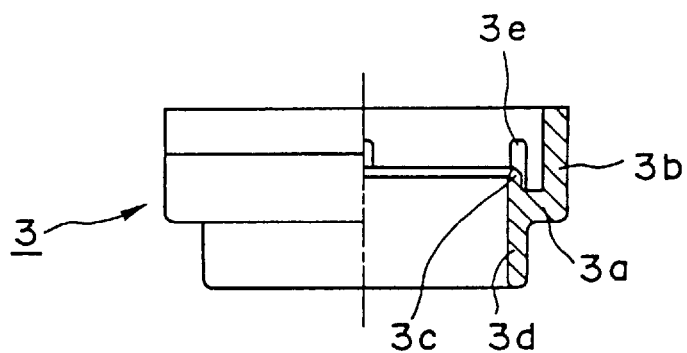
FIG. 1 is a right-half sectional front view showing an embodiment of a connection cap.
Figure 2:
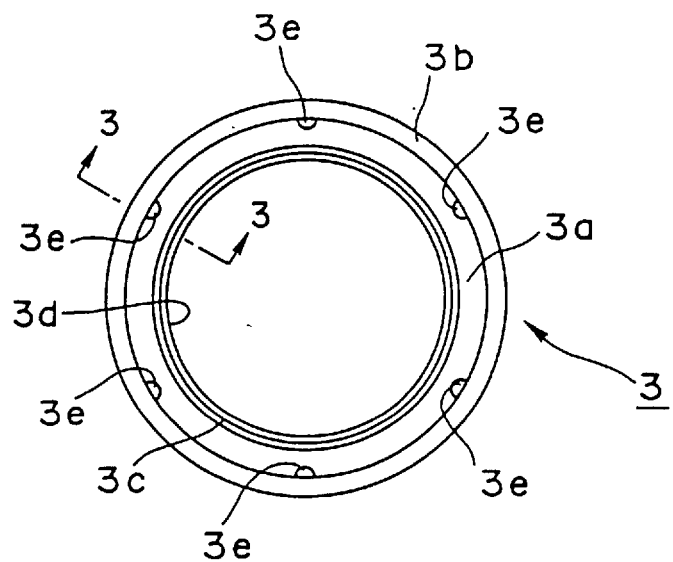
FIG. 2 is a plan view showing the same embodiment.
Figure 3:
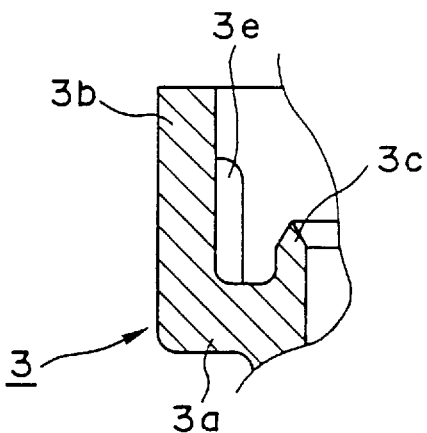
FIG. 3 is an enlarged sectional view taken on line A—A of FIG. 2.

First, referring to FIGS. 1 to 3, a connection cap 3 will be described. FIG. 1 is a right-half sectional front view; FIG. 2 is a plan view of the same; and FIG. 3 is an enlarged sectional view taken on line A—A of FIG. 2.

A connection cap 3 is, as is known, formed into a cylindrical shape and constituted by a large-diameter portion 3b having an inner diameter larger than the outer diameter of a flange portion 1a of a tube 1 (FIG. 4), a small-diameter portion 3d surrounding the tube 1, and a pressing portion 3a connecting the large and small-diameter portions 3b and 3d to each other. In embodiments of the present invention, a plurality of axially extending protrusions 3e are provided circumferentially side by side on an inner wall of the large-diameter portion 3b so as to contact with an outer circumferential edge of the flange portion 1a of the tube 1 when the flange portion 1a is disposed in the connection cap 3. In this embodiment, the protrusions 3e are provided by six in total. Further, the connection cap 3 has a known annular protrusion 3c.

Figure 4:
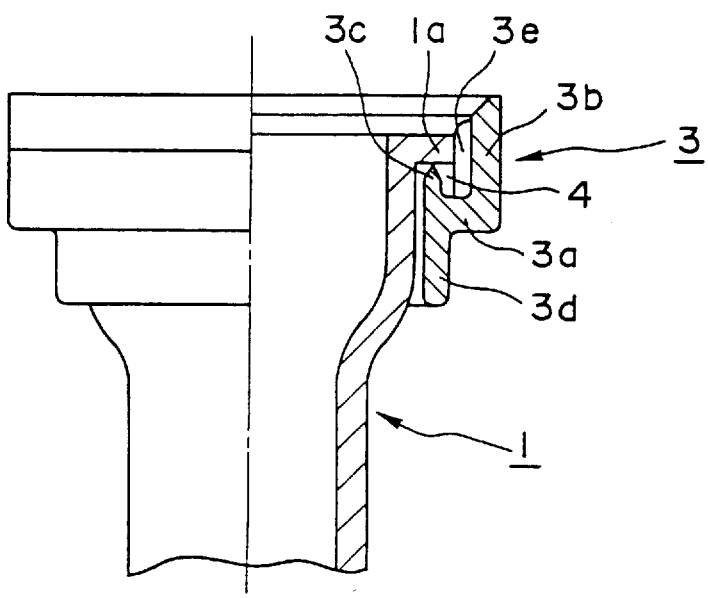
FIG. 4 is a right-half sectional front view showing an embodiment in which a tube is disposed in the connection cap.
Figure 5:
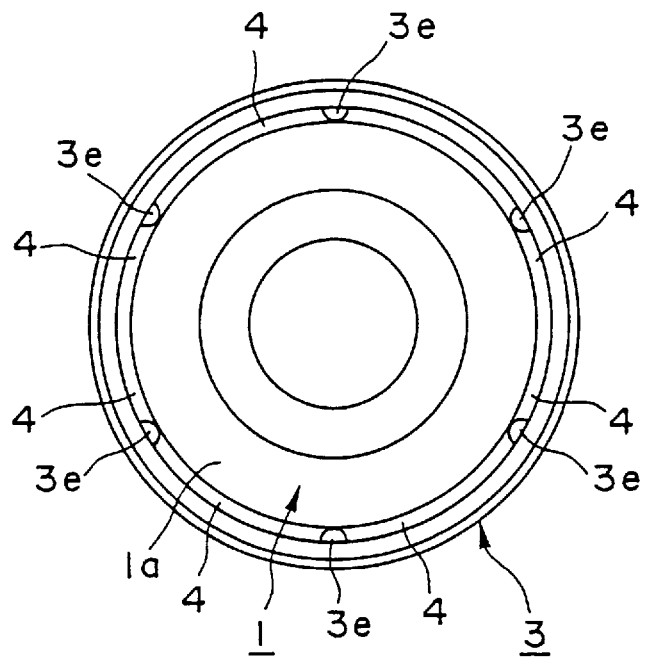
FIG. 5 is a plan view showing the same embodiment.

Next, referring to FIGS. 4 and 5, description will be made as to a state where the flange portion 1a of the tube 1 is disposed in the above-mentioned connection cap 3. FIG. 4 is a right-half sectional front view, and FIG. 5 is a plan view of the same.

The tube 1 is formed so as to have the flange portion 1a at its end portion. The tube 1 is fitted into the connection cap 3 so that the flange portion 1a is positioned on the pressing portion 3a having the annular protrusion 3c. The six axially extending protrusions 3e are formed side by side at intervals circumferentially on the inner wall of the large-diameter portion 3b of the connection cap 3 so as to contact with the outer circumferential edge of the flange portion 1a of the tube 1 when the tube 1 is fitted in the connection cap 3. Therefore, unlike the conventional example, the flange portion 1a of the tube 1 is never one-sidedly positioned at any portion of the inner wall of the large-diameter portion 3b.

When the flange portion 1a of the tube 1 is positioned on the pressing portion 3a of the connection cap 3, a nozzle (not shown) can be connected to the tube 1 by using a known method. At this time, the flange portion 1a of the tube 1 is compressed to stretch by the pressing portion 3a and the annular protrusion 3c of the connection cap 3 and a flange portion and an annular protrusion of the nozzle. However, air spaces 4 are formed between the protrusions 3e formed on the inner wall of the large-diameter portion 3b of the connection cap 3 and the outer circumferential edge of the flange portion 1a of the tube 1 and between the pressing surface of the pressing portion 3a of the connection cap 3 and a surface of the flange portion 1a of the tube 1 to be pressed, so that the stretch is absorbed in the air spaces 4.

Figure 6:
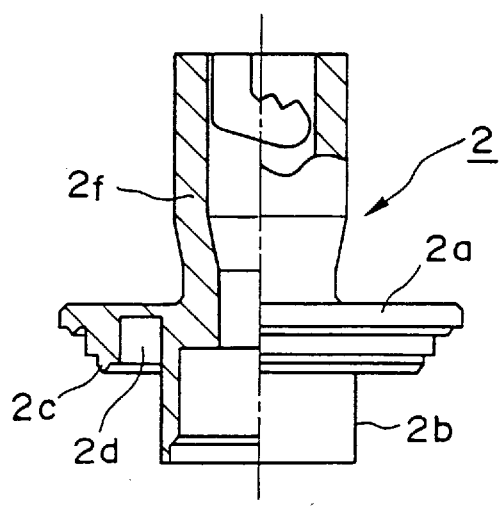
FIG. 6 is a left-half sectional front view showing an embodiment of a nozzle.
Figure 7:
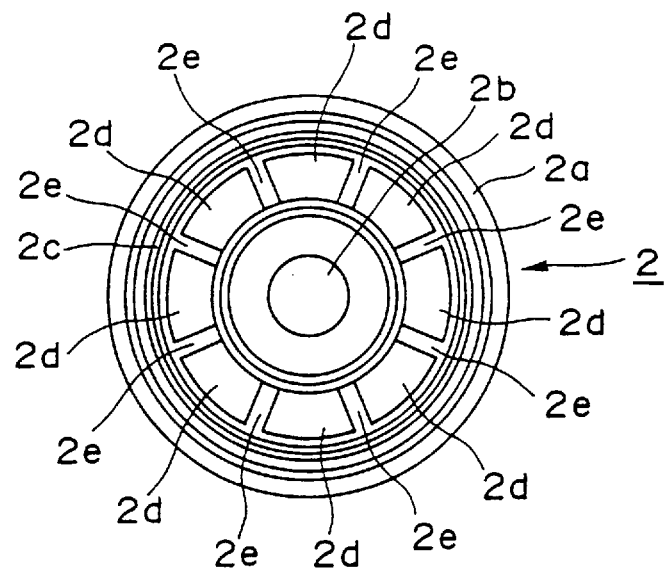
FIG. 7 is a plan view showing the same embodiment.

Next, referring to FIGS. 6 and 7, a nozzle 2 will be described. FIG. 6 is a left-half sectional front view, and FIG. 7 is a plan view of the same.

The nozzle 2 is, as is known, constituted by a connection port 2f for connection with a hose of an adhesive injector or an attachment port of a washer, a pipe portion 2b, and a flange portion 2a. In the embodiment of the present invention, an annular protrusion 2c and a recess portion 2d are formed on the tube pressing surface of the flange portion 2a in a known manner. A plurality of ribs 2e are radially formed in the recess portion 2d so as to divide the recess portion 2d. In FIG. 7, the recess portion 2d is divided into eight portions by the ribs 2e.

The recess portion 2d, which will be described later, positions the flange portion 1a of the tube on the pressing portion 3a of the connection cap 3 and absorbs squeeze-out of inward transformation of the flange portion 1a and its periphery of the tube 1 generated when the tube 1 is pressed by the nozzle 2. The ribs 2e exerts suitable pressure to the flange portion 1a of the tube 1.

Figure 8:
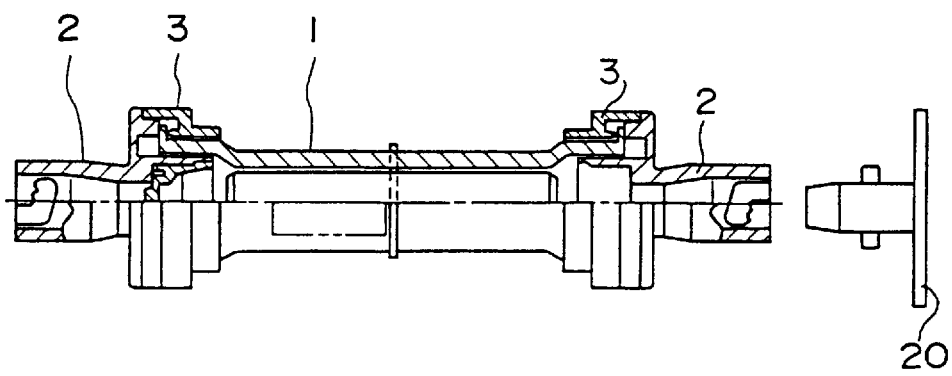
FIG. 8 is an upper-half sectional front view showing an embodiment of the adhesive injection apparatus.
Figure 9:
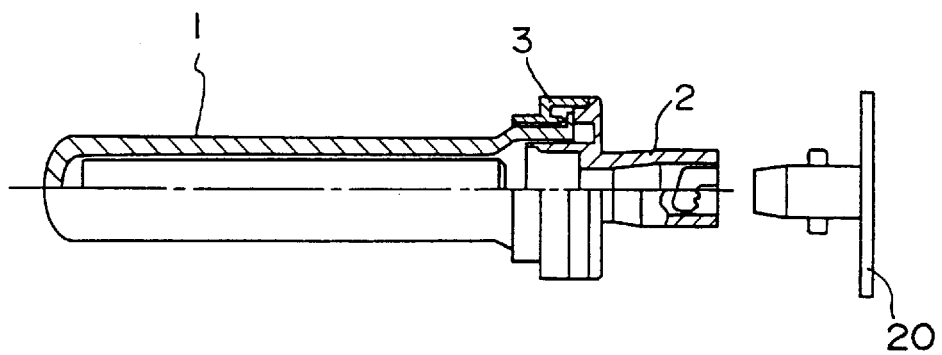
FIG. 9 is an upper-half sectional front view showing another embodiment of the adhesive injection apparatus.
Figure 10:
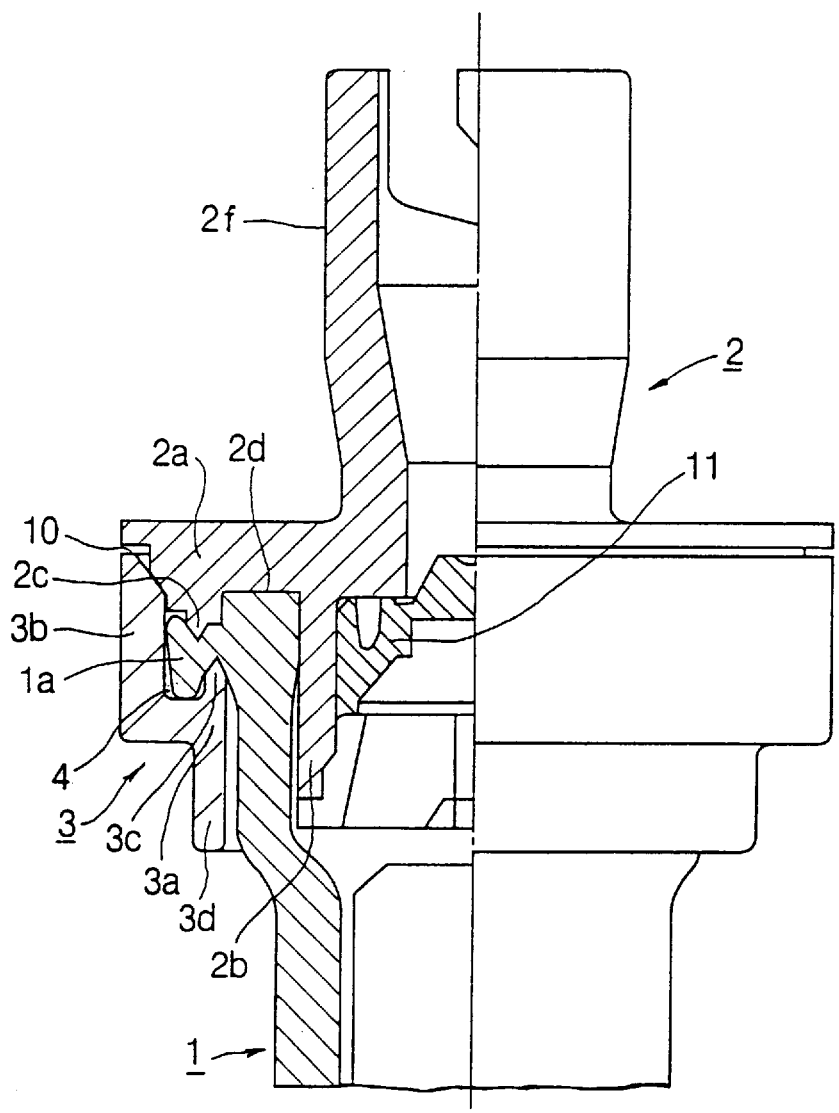
FIG. 10 is an enlarged sectional view showing a main part of the adhesive injection apparatus.
Figure 11:
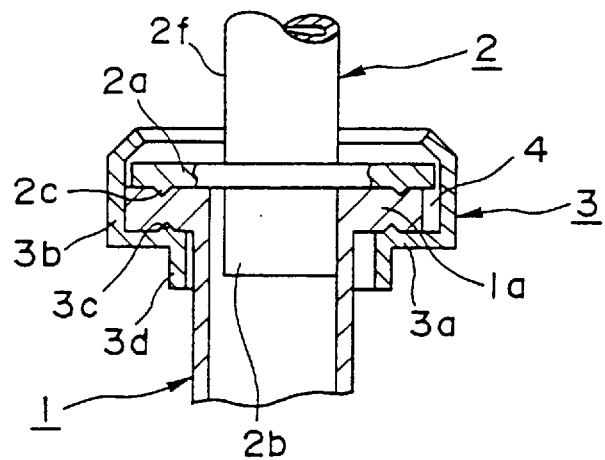
FIG. 11 is a schematic view showing an example of connection between a nozzle and a tube through a connection cap in the conventional adhesive injection apparatus.
Figure 12:
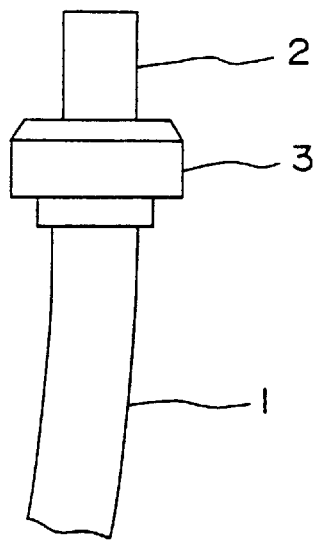
FIG. 12 is a schematic view showing an example of the conventional adhesive injection apparatus having a problem to be solved.
Figure 13:
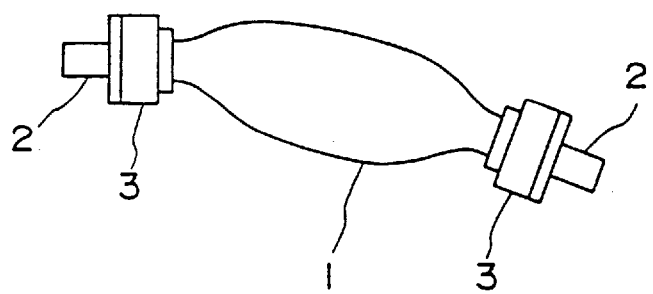
FIG. 13 is a schematic view showing another example of the conventional adhesive injection apparatus having a problem to be solved.

Next, referring to FIGS. 8 to 10, description will be made as to adhesive injection apparatuses in the state where a tube 1 and a nozzle 2 are connected to each other through a connection cap 3. FIGS. 8 and 9 are half-sectional front views showing adhesive injection apparatuses which are different in type from each other and FIG. 10 is an enlarged half-sectional view showing a main part of each of the adhesive injection apparatuses.

FIG. 8 shows an adhesive injection apparatus one end of which acts as an adhesive outlet port to be attached to cracks or the like of a structure through a washer 20, and the other end of which acts as an adhesive inlet port supplied with an adhesive from an adhesive injector. FIG. 9 shows an adhesive injection apparatus one end of which acts as an adhesive injection inlet port supplied with an adhesive from an adhesive injector and acts also as an adhesive outlet port to be attached to cracks or the like of a structure through a washer 20. FIG. 10 shows a state of connection between the tube 1 and the nozzle 2 through the connection cap 3 in detail in each of FIGS. 8 and 9.

In the drawings, first, a flange portion 1a of the tube 1 is fitted into the connection cap 3 and positioned on a pressing portion 3a having an annular protrusion 3c and connecting large and small-diameter portions 3b and 3d to each other. A plurality of axially extending protrusions 3e are provided side by side circumferentially on an inner wall of the large-diameter portion 3b of the connection cap 3 so as to contact with an outer circumferential edge of the flange portion 1a of the tube 1. Therefore, unlike the conventional example, the flange portion 1a of the tube 1 is never one-sidedly positioned to any portion of the inner wall of the large-diameter portion 3b.

Next, a pipe portion 2b of the nozzle 2 is fitted into the tube 1, and the flange portion 1a of the tube 1 is fitted into between the flange portion 2a of the nozzle 2 and the pressing portion 3a of the connection cap 3 so as to be pressed thereat.

At this time, the flange portion 1a of the tube 1 receives the compressing force from the flange portion 2a of the nozzle 2 and the pressing portion 3a of the connection cap 3 and the digging force of the annular protrusions 2c and 3c provided on the flange portion 2a of the nozzle 2 and the pressing portion 3a of the connection cap 3 respectively. As a result, the flange portion 1a and its periphery of the tube 1 are transformed.

According to the present invention, the air spaces 4 are formed between the axially extending protrusions 3e provided side by side circumferentially on the inner wall of the large-diameter portion 3b of the connection cap 3 so that the squeeze-out of outward transformation of the flange portion 1a of the tube 1 is absorbed in the air spaces 4. Further, since the recess portion 2d is formed in the pressing surface of the nozzle 2, the squeeze-out of transformation of the peripheral portion is absorbed into the air space between the outer wall of the pipe portion 2b of the nozzle 2 and the inner wall of the connection cap 3 as well as into the recess portion 2d. If the squeeze-out of inward transformation is intended to be absorbed into the air space between the pipe portion 2b of the nozzle 2 and the inner wall of the connection cap 3, it becomes necessary to increase the diameter of the connection cap 3 for margin corresponding to the air space. Such a configuration as described above, however, makes it possible to reduce the diameter of the cap. The ribs 2e provided in the recess portion 2d exert suitable pressure to the flange portion 1a of the tube 1.

Filling of an adhesive into the tube 1 is performed by connection of the connection port 2f of the nozzle 2 to a hose of the adhesive injector. At this time, as is known, a check valve 11 is opened so that the adhesive is injected into the tube 1.

In the foregoing embodiments of the present invention, the nozzle 2 and the connection cap 3 are integrated with each other through an adhesion portion 10. It is a matter of course that the means of integration between the nozzle 2 and the connection cap 3 is not limited to adhesion but may be fitting; spirally fitting; adhesion; fusing; or the like, in accordance with the shape and the structure of each of the cases.

As described above, according to the present invention, the following effects are obtained.

That is, since the plural axially extending protrusions are provided side by side circumferentially on the inner wall of the large-diameter portion of the connection cap so as to contact with the outer circumferential edge of the flange portion of the tube, the flange portion of the tube is never one-sidedly positioned to the inner wall of the large-diameter portion but can be located at the center of the large-diameter portion. Therefore, the nozzle, the connection cap, and the tube are linearly integrated with each other and hence when an adhesive is injected from the adhesive injector into the tube, the force acting on the tube in the direction of coming-off is made uniform so that the tube can be prevented from being curved, unlike the conventional example. Accordingly, the possibility of coming-off of the tube from the connection cap can be eliminated.

Further, since the flange portion of the nozzle is preferably provided with the recess portion and the ribs, the ribs suitably press the flange portion of the tube and the recess portion absorbs the squeeze-out of inward transformation of the flange portion and its periphery of the tube.

What is claimed is:

1. An adhesive injection apparatus comprising:

an adhesive reservoir tube having a flange portion;

a connection cap having a pressing portion, a large-diameter portion, and a plurality of axially extending protrusions formed side by side circumferentially on an inner wall of said large-diameter portion, said large-diameter portion having an inner diameter larger than an outer diameter of said flange portion of said adhesive reservoir tube; and a nozzle having a flange portion;

wherein when said adhesive reservoir tube and said nozzle portion are connected to each other, said flange portion of said adhesive reservoir tube is interposed between said pressing portion of said connection cap and said flange portion of said nozzle so that said flange portion of said adhesive reservoir tube is pressed by said pressing portion of said connection cap and said flange portion of said nozzle in a condition that said plurality of axially extending protrusions of said connection cap are in contact with an outer edge of said flange portion of said adhesive reservoir tube.

2. An adhesive injection apparatus according to claim 1, wherein said nozzle has a recess portion which is formed in a pressing surface of said flange portion of said nozzle for pressing said flange portion of said adhesive reservoir tube, and has a plurality of radially extending ribs formed in said recess portion so as to divide said recess portion into sections.

* * * * *